US011267068B2

(12) United States Patent
Muzilla et al.

(10) Patent No.: US 11,267,068 B2
(45) Date of Patent: *Mar. 8, 2022

(54) SYSTEMS AND METHODS FOR REAL TIME, LONG DISTANCE, REMOTE WELDING

(71) Applicant: Lincoln Global, Inc., Santa Fe Springs, CA (US)

(72) Inventors: David J. Muzilla, Wadsworth, OH (US); Bruce J. Chantry, Solon, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,019

(22) Filed: Aug. 19, 2020

(65) Prior Publication Data

US 2021/0053137 A1 Feb. 25, 2021

Related U.S. Application Data

(63) Continuation of application No. 15/626,655, filed on Jun. 19, 2017, now Pat. No. 10,828,716.

(51) Int. Cl.
*H05B 7/11* (2006.01)
*B23K 9/10* (2006.01)
(Continued)

(52) U.S. Cl.
CPC .......... *B23K 9/1087* (2013.01); *B23K 9/0956* (2013.01); *B25J 9/1689* (2013.01);
(Continued)

(58) Field of Classification Search
CPC ........ B23K 9/09; B23K 9/095; B23K 9/0953; B23K 9/0956; B23K 9/1006;
(Continued)

(56) References Cited

U.S. PATENT DOCUMENTS 5,436,542 A 7/1995 Petelin
6,470,236 B2 10/2002 Ohtsuki
(Continued)

FOREIGN PATENT DOCUMENTS

CN 104057202 A 9/2014
CN 106231614 A 12/2016
(Continued)

OTHER PUBLICATIONS

Ming, et al.; "On Teleoperation of An Arc Welding Robotic System;" Proceeding of the 1996 IEEE International Conference on Robotics and Automation; Dated Apr. 1996; pp. 1275-1280.
(Continued)

*Primary Examiner* — Hung D Nguyen
(74) *Attorney, Agent, or Firm* — David J. Muzilla

(57) ABSTRACT

Embodiments of systems and methods for remotely controlling a robotic welding system over a long distance in real time are disclosed. One embodiment is a method that includes tracking movements and control of a mock welding tool operated by a human welder at a local site and generating control parameters corresponding to the movements and control. The control parameters are transmitted from the local site to a robotic welding system at a remote welding site over an ultra-low-latency communication network. The round-trip communication latency over the ultra-low-latency communication network is between 0.5 milliseconds and 20 milliseconds, and a distance between the local site and the remote welding site is at least 50 kilometers. An actual welding operation of the robotic welding system is controlled to form a weld at the remote welding site via remote robotic control of the robotic welding system in response to the control parameters.

22 Claims, 8 Drawing Sheets

(51) Int. Cl.
*B23K 9/095* (2006.01)
*B25J 9/16* (2006.01)
*B25J 19/02* (2006.01)
*H04L 67/12* (2022.01)
*B23K 9/00* (2006.01)

(52) U.S. Cl.
CPC .......... *B25J 9/1697* (2013.01); *B25J 19/026* (2013.01); *H04L 67/12* (2013.01)

(58) Field of Classification Search
CPC .... B23K 9/1062; B23K 9/1087; B23K 9/173; B23K 9/32; B25J 9/1689; B25J 9/1697; B25J 19/026; H04L 67/12
USPC ...................................... 219/132, 136, 137 R
See application file for complete search history.

(56) References Cited

U.S. PATENT DOCUMENTS

| | | | |
|---|---|---|---|
| 6,479,792 B1 | 11/2002 | Beiermann | |
| 6,518,995 B1 | 2/2003 | Ghole | |
| 6,624,388 B1 | 9/2003 | Blankenship | |
| 6,758,875 B2 | 7/2004 | Reid | |
| 7,129,442 B2 | 10/2006 | Ruthven | |
| 7,605,347 B2 | 10/2009 | Izawa | |
| 7,930,065 B2 | 4/2011 | Larkin | |
| 9,505,130 B2 | 11/2016 | Hunt | |
| 2002/0073788 A1 | 6/2002 | Hatley | |
| 2002/0074965 A1 | 6/2002 | Hatley | |
| 2002/0089298 A1 | 7/2002 | Hatley | |
| 2003/0089087 A1 | 5/2003 | Reid | |
| 2004/0028169 A1 | 2/2004 | Latreille | |
| 2004/0074945 A1 | 4/2004 | Brady | |
| 2005/0065653 A1 | 3/2005 | Ban | |
| 2005/0117686 A1 | 6/2005 | Latreille | |
| 2005/0217394 A1 | 10/2005 | Langley | |
| 2005/0263499 A1 | 12/2005 | Menin | |
| 2006/0000817 A1 | 1/2006 | Inoue | |
| 2006/0198488 A1 | 9/2006 | Latreille | |
| 2007/0062916 A1 | 3/2007 | Rippl | |
| 2007/0209195 A1 | 9/2007 | Blocquel | |
| 2008/0218592 A1 | 9/2008 | Jahn | |
| 2009/0089700 A1 | 4/2009 | Gu | |
| 2009/0098898 A1 | 4/2009 | Patterson | |
| 2009/0230100 A1 | 9/2009 | Menin | |
| 2009/0298024 A1 | 12/2009 | Batzler et al. | |
| 2010/0108654 A1 | 5/2010 | Ulrich | |
| 2010/0140240 A1 | 6/2010 | Turner | |
| 2010/0174395 A1 | 7/2010 | Gu | |
| 2010/0223706 A1 | 9/2010 | Becker | |
| 2010/0224611 A1 | 9/2010 | Kapoor | |
| 2010/0284692 A1 | 11/2010 | Szell et al. | |
| 2011/0083241 A1 | 4/2011 | Cole | |
| 2011/0091846 A1 | 4/2011 | Kreindl | |
| 2011/0224815 A1 | 9/2011 | Sonner | |
| 2012/0229632 A1 | 9/2012 | Hoertenhuber | |
| 2013/0016176 A1 | 1/2013 | Hines et al. | |
| 2013/0075380 A1* | 3/2013 | Albrech | B23K 9/1006 219/137 R |
| 2013/0218336 A1 | 8/2013 | Olivier | |
| 2014/0014637 A1 | 1/2014 | Hunt | |
| 2014/0049382 A1* | 2/2014 | Dina | G08C 17/02 340/12.5 |
| 2014/0144899 A1 | 5/2014 | Ulrich | |
| 2014/0210496 A1 | 7/2014 | Huang et al. | |
| 2015/0103680 A1 | 4/2015 | Anand et al. | |
| 2016/0175964 A1 | 6/2016 | Penoyer et al. | |
| 2016/0260261 A1 | 9/2016 | Hsu | |
| 2016/0261504 A1 | 9/2016 | Sung et al. | |
| 2016/0267806 A1 | 9/2016 | Hsu et al. | |
| 2017/0056999 A1 | 3/2017 | Marschke | |
| 2017/0232615 A1* | 8/2017 | Hammock | B23K 26/032 700/119 |
| 2018/0126476 A1* | 5/2018 | Meess | B23K 9/0956 |
| 2018/0230377 A1* | 8/2018 | Chen | C09K 11/703 |

FOREIGN PATENT DOCUMENTS

| | | |
|---|---|---|
| FR | 2 957 000 B1 | 3/2012 |
| JP | H07-299561 A | 11/1995 |
| JP | H09-76063 A | 3/1997 |
| JP | 2002-096169 A | 4/2002 |
| JP | 2003-230959 A | 8/2003 |
| WO | 2011/029118 A2 | 3/2011 |
| WO | 2016/064660 A1 | 4/2016 |
| WO | 2016/089545 A1 | 6/2016 |

OTHER PUBLICATIONS

Aijaz, et al.; "Realizing the Tactile Internet: Haptic Communications over Next Generation 5G Cellular Networks;" arXiv:1510.02826v2 IEEE Wireless Communications; Dated Dec. 30, 2015; pp. 1-8.

Huawei; "Tactile Internet, a Magic of 5G;" www.huawei.com/minisite/5g/en/touch-internet-5G.html; Accessed on Jun. 1, 2017; pp. 1-4.

* cited by examiner

SYSTEMS AND METHODS FOR REAL TIME, LONG DISTANCE, REMOTE WELDING

CROSS REFERENCE TO RELATED APPLICATIONS/INCORPORATION BY REFERENCE

This U.S. Patent Application is a Continuation of U.S. patent application Ser. No. 15/626,655, filed on Jun. 19, 2017, and is incorporated herein by reference in its entirety.

FIELD

Embodiments of the present invention relate to systems and methods associated with welding. More specifically, embodiments of the present invention relate to systems and methods for performing long distance, real time, remote welding.

BACKGROUND

Today, human welders are often expert welders with many years of experience in a particular type of welding. When a critical part or structure fails (e.g., in a plant, a factory, or in the field), a particular type of expert welder may be needed quickly to fix the problem. However, such an expert welder may not be readily available at the location, causing significant down time and/or a safety problem until the expert welder can travel to the location to fix the problem. There is a need to have access to such an expert welder to fix a critical part or structure in a timelier manner. Furthermore, certain areas where a critical part or structure is located may not be very hospitable to human beings. For example, environmental factors such as heat, humidity, chemicals, or radiation may pose a problem for a human welder. There is a need to have remote access to such inhospitable areas (e.g., Low Earth Orbit space).

SUMMARY

Embodiments of the present invention include systems and methods related to remote welding. A human welder located in one place can remotely perform a welding operation in another place. For example, an available expert welder located in a first place, who is an expert in a particular type of welding associated with nuclear reactors, can fix a nuclear reactor structure in a second place which is miles away. In one embodiment, an expert welder at a first location can use a welding torch/gun to control a robot holding a similar welding torch/gun at a remote location. The welding torch/gun held by the expert welder is inactive but has accelerometers or gyros that indicate the position and orientation of the welding torch/gun in three-dimensional space. As the expert welder moves the torch/gun, the torch/gun held by the robot at the remote location moves in the same way to actively create a weld. The expert welder has a view (video and sound) of the welding environment (workpiece, torch/gun, weld puddle, etc.) at the remote location (e.g., via a head-mounted display). There is a small roundtrip communication latency (e.g., about 1 ms) between the first location and the remote location such that the expert welder does not get cyber sick (i.e., it will appear to the expert welder that what he is doing with the torch/gun at the first location is happening at the exact same time at the remote location). In this way, remote welding over longer distances can be accomplished in real time. One key to effectively welding remotely over longer distances is an ultra-low latency communication network between the two locations. Even though arc welding is mainly discussed herein, certain embodiments may be applicable to other types of welding as well such as, for example, electron beam welding or laser beam welding. The term "arc" as used herein refers to a plasma arc and the term "beam" as used herein may refer to an electron beam or a laser beam.

One embodiment includes a system for performing long distance, real time, remote welding. The system includes a robotic welding system configured to be set up at a remote welding site to perform an actual welding operation. The system also includes a simulated welding system configured to be set up at a local site. The robotic welding system includes a welding torch, a camera, and a first controller. The first controller is configured to control the robotic welding system and capture video of at least an arc or a beam between a workpiece and the welding torch during the actual welding operation via the camera. The simulated welding system includes a head-mounted display device configured to be worn by a human welder to observe at least the video at the local site. The simulated welding system also includes a mock welding tool configured to remotely control the welding torch in response to the human welder holding and moving the mock welding tool at the local site while observing at least the video. The simulated welding system further includes a second controller configured to control the simulated welding system and generate control parameters while tracking movements and control of the mock welding tool. In one embodiment, the first controller and the second controller each include at least one of a three-dimensional integrated circuit chip, a three-dimensional integrated circuit chip-stack, optical waveguides embedded in circuit boards, optical integrated transceivers within chip-stacks, and fully wireless chip-to-chip interconnectivity of circuit boards within a chassis. The system also includes an ultra-low-latency communication network configured to provide communication of at least the video and the control parameters between the first controller at the remote welding site and the second controller at the local site. In one embodiment, a round-trip communication latency between the first controller and the second controller is between 0.5 milliseconds and 20 milliseconds, and a straight-line distance between the remote welding site and the local site is at least 50 kilometers. As used herein, the term "straight-line distance" corresponds to the meaning of the term "as the crow flies". In one embodiment, at least one of the first controller or the second controller is configured to run a latency test to determine the round-trip communication latency between the first controller at the remote welding site and the second controller at the local site. The robotic welding system is configured to form an actual weld on (e.g., a weld bead across) the workpiece at the remote welding site, during the actual welding operation, via remote robotic control of the welding torch via the mock welding tool in response to at least the control parameters. In one embodiment, the ultra-low-latency communication network includes at least one of a radio frequency wireless network segment and an optical fiber network segment. In one embodiment, the ultra-low-latency communication network is a dedicated and private network operating between the remote welding site and the local site. In one embodiment, the ultra-low-latency communication network includes at least one of passive optical components, dark fiber, dispersion compensation modules, non-forward error correction transponders, software-defined networks, and network functions virtualization techniques. In one embodiment, the ultra-low-latency communication network includes at least one of a three-dimensional integrated circuit chip, a three-dimensional integrated circuit chip-stack, optical waveguides embedded in circuit boards, optical integrated transceivers within chip-stacks, and fully wireless chip-to-chip interconnectivity of circuit boards within a chassis. In one embodiment, the robotic welding system includes an auto-darkening filter. The first controller is configured to capture the video of at least the arc or the beam between the workpiece and the welding torch during the actual welding operation via the camera observing through the auto-darkening filter. In one embodiment, the robotic welding system includes a microphone. The first controller is configured to capture audio of at least the arc or the beam between the workpiece and the welding torch during the actual welding operation via the microphone. The ultra-low-latency communication network is configured to provide communication of the audio from the first controller at the remote welding site to the second controller at the local site to be observed by the human welder via the head-mounted display device at the local site. In one embodiment, the mock welding tool includes one or more sensors configured to monitor at least one of a position and an orientation of the mock welding tool and provide corresponding position and orientation signals to the second controller for tracking the mock welding tool in three-dimensional space. In another embodiment, the one or more sensors are external to the mock welding tool.

One embodiment includes a method of remotely controlling a robotic welding system over a long distance in real time. The method includes tracking movements and control of a mock welding tool operated by a human welder at a local site and generating control parameters corresponding to the movements and control of the mock welding tool. The method also includes transmitting the control parameters from the local site to a robotic welding system at a remote welding site over an ultra-low-latency communication network. In one embodiment, a round-trip communication latency between the local site and the remote welding site over the ultra-low-latency communication network is between 0.5 milliseconds and 50 milliseconds, and a straight-line distance between the local site and the remote welding site is at least 100 kilometers. The method further includes controlling an actual welding operation of the robotic welding system at the remote welding site to form an actual weld on (e.g., a weld bead across) a workpiece at the remote welding site via remote robotic control of the robotic welding system in response to the control parameters. In one embodiment, a welding torch of the robotic welding system follows the movements and the control of the mock welding tool operated by the human welder at the local site in real time. In one embodiment, the movements of the mock welding tool operated by the human welder are along a simulated workpiece at the local site which simulates the workpiece at the remote welding site. In one embodiment, the method includes determining when a tip of the welding torch of the robotic welding system is not at a proper distance from the workpiece during the actual welding operation at the remote welding site. A feedback signal is transmitted from the remote welding site to the local site, over the ultra-low-latency communication network, when the tip of the welding torch is not at the proper distance. A haptic response is generated within the mock welding tool at the local site in response to the feedback signal. In one embodiment, the method includes determining when the welding torch of the robotic welding system is not at a proper angle with respect to the workpiece during the actual welding operation at the remote welding site. A feedback signal is transmitted from the remote welding site to the local site, over the ultra-low-latency communication network, when the welding torch is not at the proper angle. A haptic response is generated within the mock welding tool at the local site in response to the feedback signal. In one embodiment, the method includes determining when the welding torch of the robotic welding system is not moving at a proper travel speed with respect to the workpiece during the actual welding operation at the remote welding site. A feedback signal is transmitted from the remote welding site to the local site, over the ultra-low-latency communication network, when the welding torch is not moving at the proper travel speed. A haptic response is generated within the mock welding tool at the local site in response to the feedback signal. In one embodiment, the method also includes capturing video of at least an arc or a beam formed between the workpiece and the welding torch during the actual welding operation at the remote welding site. The video from the remote welding site is transmitted to the local site over the ultra-low-latency communication network and displayed to the human welder at the local site in real time as the human welder moves the mock welding tool during the actual welding operation. In one embodiment, the video is captured through an auto-darkening filter at the remote welding site. In one embodiment, the method also includes capturing audio of at least the arc or beam formed between the workpiece and the welding torch during the actual welding operation at the remote welding site. The audio from the remote welding site is transmitted to the local site over the ultra-low-latency communication network and played to the human welder at the local site in real time as the human welder moves the mock welding tool during the actual welding operation. In one embodiment, the method includes employing at least one of predictive, interpolative, or extrapolative techniques, near an edge of the ultra-low-latency communication network near the remote welding site, to anticipate the control parameters corresponding to the movements and the control of the mock welding tool over a next millisecond or more.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Embodiments of systems and methods for performing real time, long distance, remote welding are disclosed. In one embodiment, a mock welding tool is used by a human welder at a local site to remotely control an actual welding torch/gun at a remote location to perform an actual welding operation while remotely observing (e.g., visually, audibly, and tactily) the actual welding operation. The welding torch/gun at the remote location responds immediately to the human welder's movements of the mock welding tool such that the human welder does not get "cyber sick". That is, it will appear to the human welder that what he/she is doing with the mock welding tool at the local site is happening at the exact same time with the actual welding torch/gun at the remote location. The communication latency between the local site and the remote welding site is short enough such that the human welder does not perceive any visual, audio, or tactile delay that would result in the human welder feeling disoriented or confused.

Figure 1:
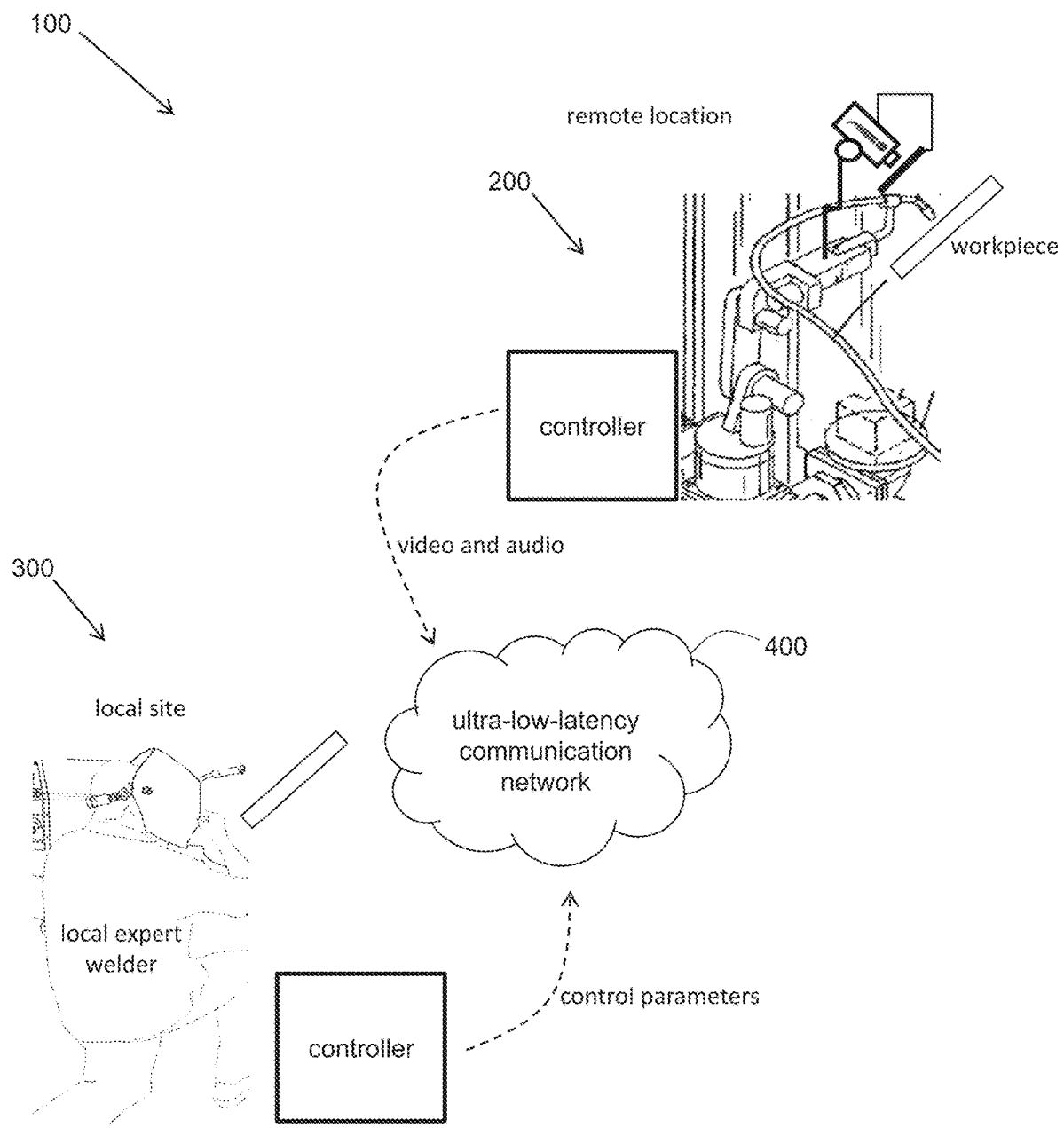
FIG. 1 illustrates an embodiment of a system for performing long distance, real time, remote welding.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates one embodiment of a system 100 for performing long distance, real time, remote welding. The terms "gun" and "torch" are used interchangeably herein with respect to welding.

Referring to FIG. 1, the system 100 includes a robotic welding system 200, at a remote welding site, and a simulated welding system 300, at a local site, which communicate with each other over an ultra-low-latency (ULL) communication network 400. In accordance with one embodiment, the round-trip communication latency between the robotic welding system 200 and the simulated welding system 300 over the ULL communication network 400 is between 0.5 milliseconds and 10 milliseconds, and a straight-line distance (as the crow flies) between the remote welding site and the local site is at least 10 kilometers. As used herein, the round-trip communication latency is a measure of time it takes a packet of data to travel from the simulated welding system, at the local site, to the robotic welding system, at the remote welding site, and back again. When a human interacts with a technical system, the interaction appears to be innate and instinctive to the human only when the feedback between the human and the system corresponds to the reaction time of the human. For example, human auditory reaction time is about 100 milliseconds, human visual reaction time is about 10 milliseconds, and human tactile reaction time is about one millisecond.

In general, communication latency is limited by the components and operation of the communication network between the local site and the remote site. Ultimately, however, if a communication network contributed no latency (i.e., an ideal network), the communication latency would still be limited by the speed of light which is about 300,000 kilometers per second. That is, light can travel about 300 kilometers in one millisecond in a vacuum. Therefore, the distance between two sites would have to be less than 150 kilometers to achieve a round-trip communication latency of one millisecond. The greater the communication latency due to components of the communication network between the two sites, the closer the two sites have to be to maintain the round-trip communication latency of, for example, one millisecond.

A communication network that is capable of achieving ultra-low-latencies over long distances will use advanced technologies. For example, in one embodiment, the ULL communication network 400 may employ one or more of passive optical components, dark fiber, dispersion compensation modules, not-forward error correction transponders, software-defined networks, and network functions virtualizations techniques. Additional advanced technologies that the ULL communication network 400 may employ include three-dimensional integrated circuit chips, three-dimensional integrated circuit chip-stacks, optical waveguides embedded in circuit boards, optical integrated transceivers within chip-stacks, and fully wireless chip-to-chip interconnectivity of circuit boards within a chassis. Other advanced technologies are possible as well, in accordance with other embodiments. In accordance with one embodiment, such advanced technologies may be employed in a network of Low Earth Orbit (LEO) satellites which are part of a ULL communication network supporting long distance, real time, remote welding.

Figure 2:
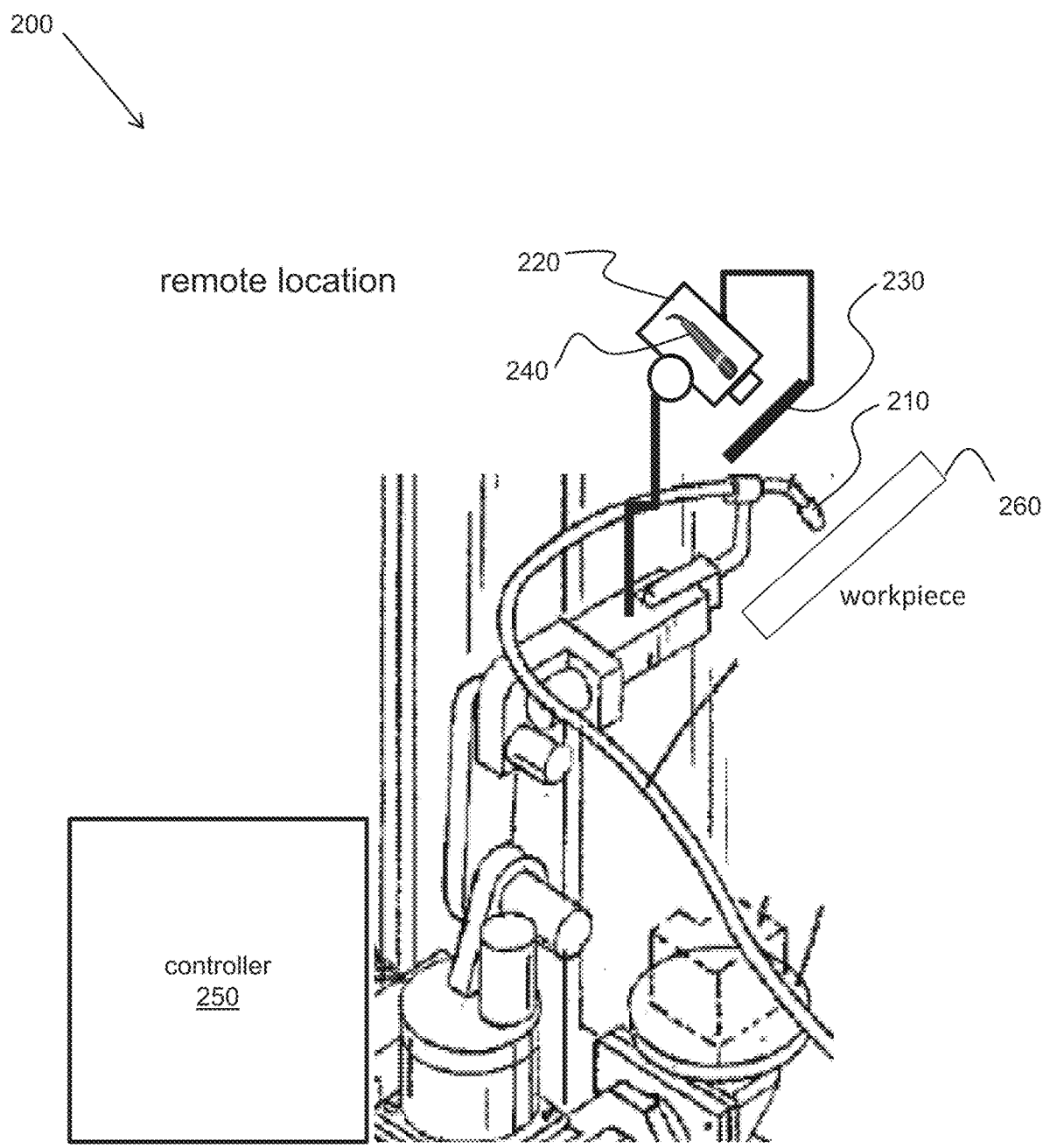
FIG. 2 illustrates an embodiment of a robotic welding system of the system of FIG. 1.

FIG. 2 illustrates an embodiment of the robotic welding system 200 of the system 100 of FIG. 1. The robotic welding system 200 is configured to be set up at a remote welding site to perform an actual welding operation via remote control. The robotic welding system 200 includes a welding torch 210, a video camera (or other imaging sensor) 220, an auto-darkening filter 230, a microphone (or other audio sensor) 240, and a controller 250. In one embodiment, the welding torch 210 is attached to an arm of the robotic welding system 200. Movement of the arm (and thus the welding torch 210) is commanded by the controller 250. For example, in one embodiment, the arm may provide for at least six degrees of freedom of movement of the welding torch 210 under the control of the controller 250. However, in accordance with one embodiment, the controller 250 controls movement of the arm (and thus the welding torch 210) in response to control parameters received from the simulated welding system 300 over the ULL communication network 400 as discussed later herein.

The controller 250 is configured to control the robotic welding system 200 and capture video and audio, respectively, via the camera 220 and the microphone 240, of a plasma arc, an electron beam, or a laser beam between a workpiece 260 and the welding torch 210 during an actual welding operation. In one embodiment, the video is captured by the camera 220 observing through the auto-darkening filter 230. The camera 220, the auto-darkening filter 230, and the microphone 240 may be directly or indirectly attached to the arm of the robotic welding system 200, in accordance with one embodiment, such that the camera 220, the auto-darkening filter 230, and the microphone 240 move to follow the point where the torch 210 contacts the workpiece 260 (e.g., via 2-axes of motion, x and y, relative to a plane of the workpiece 260). In accordance with another embodiment, the camera 220, the auto-darkening filter 230, and the microphone 240 are controlled in another manner to follow the point where the torch 210 contacts the workpiece 260 (e.g., via a separate motion controller tracking the motion of the torch 210 via input from the camera 220). The video and audio are provided, respectively, from the camera 210 and the microphone 240 to the controller 250. The controller 250 is configured to transmit the video and audio in real time to the simulated welding system 300 over the ULL communication network 400.

Figure 3:
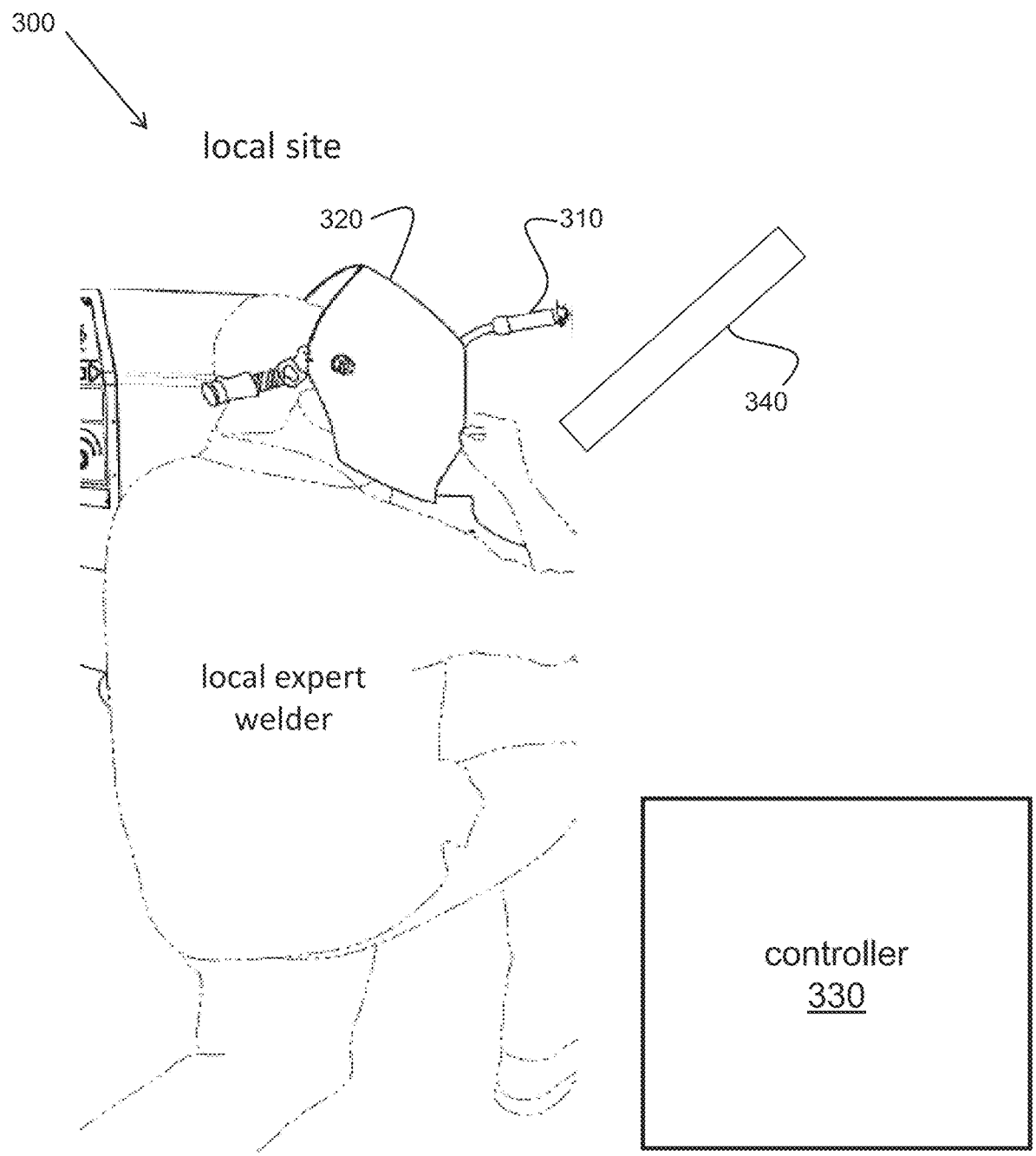
FIG. 3 illustrates an embodiment of a simulated welding system of the system of FIG. 1.

FIG. 3 illustrates an embodiment of the simulated welding system 300 of the system 100 of FIG. 1. The simulated welding system 300 is configured to be set up at a local site to perform a simulated welding operation that remotely controls the actual welding operation at the remote welding site over the ULL communication network 400. The simulated welding system 300 includes a mock welding tool 310, a head-mounted display device 320, and a controller 330. The head-mounted display device 320 is configured to be worn by a human welder (e.g., the local expert welder in FIG. 3) to observe the video and audio from the robotic welding system 200 at the remote welding site. The mock welding tool 310 is configured to remotely control the welding torch 210 in response to the human welder holding and moving the mock welding tool 310 at the local site while observing the video and the audio. For example, the human welder may move the mock welding tool 310 along a simulated workpiece or coupon 340 which simulates the real-world workpiece 260 at the remote welding site. The controller 330 is configured to control the simulated welding system 300 and generate control parameters while tracking positions and movements of the mock welding tool 310 in three-dimensional space. For example, in one embodiment, the controller 330 includes a spatial tracking technology for tracking position and orientation of the mock welding tool 310 over time. The spatial tracking technology may be, for example, magnetically-based in accordance with one embodiment, or inertially-based, in accordance with another embodiment. Other types of spatial tracking technologies are possible as well, in accordance with other embodiments.

Referring again to FIG. 1, the ULL communication network 400 is configured to provide communication of the video, the audio, and the control parameters between the controller 330 at the local site and the controller 250 at the remote welding site in real time. Again, in accordance with one embodiment, the round-trip communication latency between the robotic welding system 200 and the simulated welding system 300 over the ULL communication network 400 is between 0.5 milliseconds and 10 milliseconds, and a straight-line distance (as the crow flies) between the remote welding site and the local site is at least 10 kilometers. In this manner, the robotic welding system 200 is configured to form an actual weld on the workpiece 260 at the remote welding site, during an actual welding operation, via remote robotic control of the welding torch 210 via the mock welding tool 310 in response to the control parameters. During the actual welding operation, the human welder moves the mock welding tool 310 and observes the video and the audio via the head-mounted display device 320. As a result, the human welder has the experience of actually welding at the remote welding site without suffering adverse effects such as cyber sickness.

In accordance with one embodiment, the controller 250 is configured to perform a latency test to determine the round-trip communication latency between the controller 250 at the remote welding site and the controller 330 at the local site along a path through the ULL communication network. In accordance with another embodiment, the controller 330 is configured to perform a latency test to determine the round-trip communication latency between the controller 250 at the remote welding site and the controller 330 at the local site along a path through the ULL communication network. Such a latency test may include sending time-stamped packets of data back and forth between the controller 250 and the controller 330 and calculating an average latency across the packets. In this manner, the desired or required latency between the two sites can be verified before attempting to perform the remote welding operation. Other types of latency tests are possible as well, in accordance with other embodiments.

A ULL communication network may provide for more than one path through the ULL communication network. Different paths may have different latencies. The controller can have prior knowledge of the various paths through the ULL communication network, in accordance with one embodiment. When a latency test fails (i.e., the latency is determined to be too long), the controller that performed the latency test can perform a subsequent latency test along a different path through the ULL communication network. Such latency testing may continue until an acceptable path is determined, or until all paths are exhausted.

Figure 4:
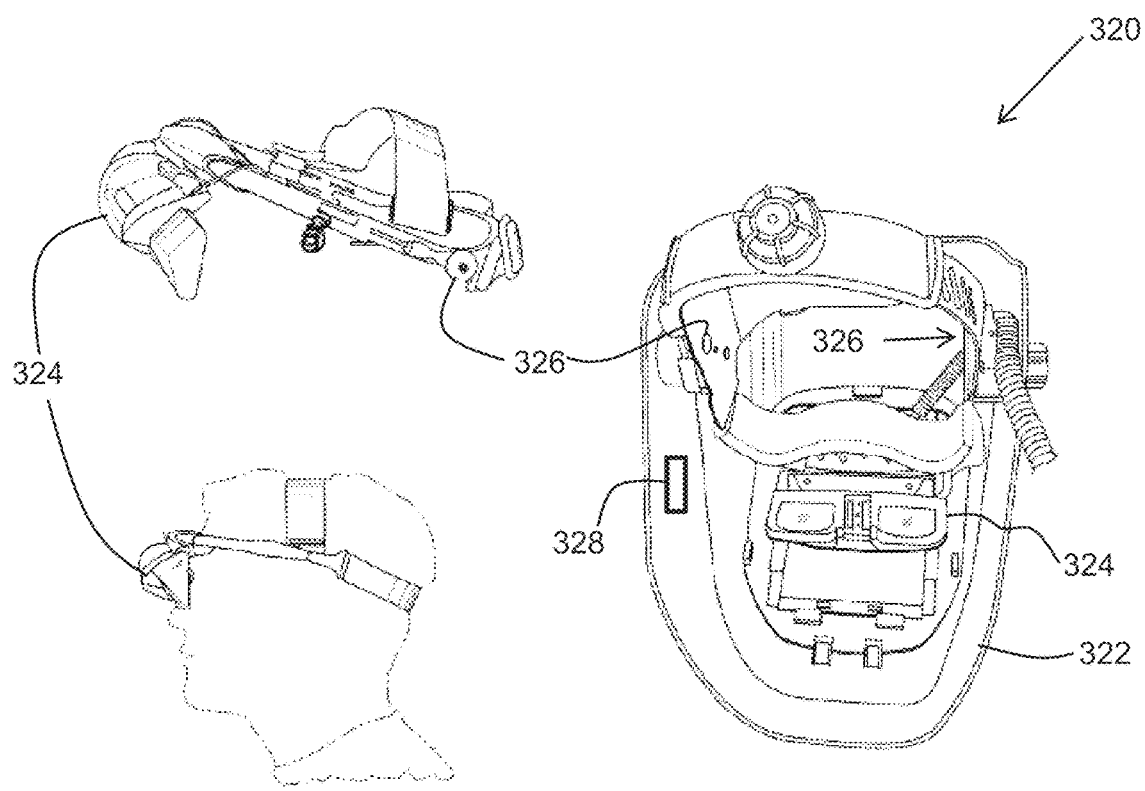
FIG. 4 illustrates an embodiment of a head-mounted display device and an embodiment of a mock welding tool of the simulated welding system of FIG. 3.
Figure 4:
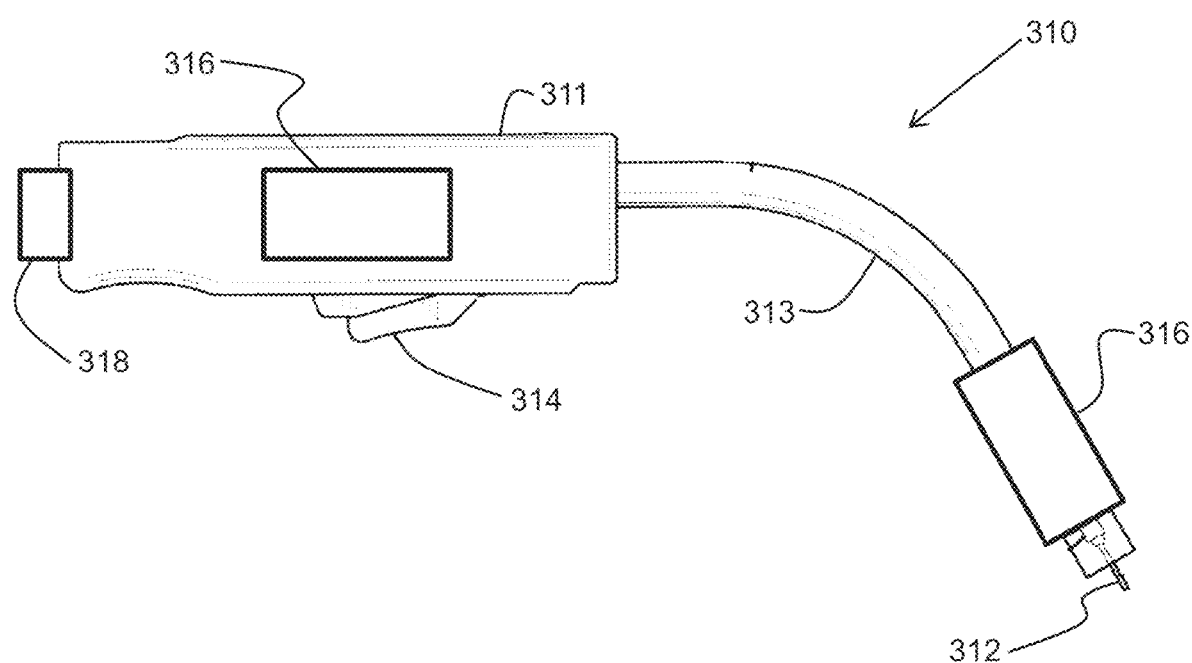

FIG. 4 illustrates an embodiment of the head-mounted display device 320 and an embodiment of the mock welding tool 310 of the simulated welding system 300 of FIG. 3. The mock welding tool 310 includes a handle 311, a tip 312, a gooseneck 313, and a trigger 314. The mock welding tool 310 also includes inertial sensors 316 (e.g., accelerometers or gyros) which are used to generate signals for tracking the position, orientation, and motion of the mock welding tool 310 in three-dimensional space. In accordance with another embodiment, the simulated welding system 300 includes sensors that are external to the mock welding tool 310 to track the mock welding tool 310 in three-dimensional space. Such external sensors may include, for example, laser devices or camera devices to sense the position, orientation, and/or movement of the mock welding tool 310. In one embodiment, a pendant is attached to the mock welding tool 310 which is sensed by an array of sensors located above at the local site.

The mock welding tool 310 also includes a wireless transmitter 318 for wirelessly communicating with the controller 330. For example, in one embodiment, data representing the position of the trigger 314 and the signals for tracking the position, orientation, and motion of the mock welding tool 310 is wirelessly communicated to the controller via the wireless transmitter 318. In another embodiment, the data is communicated in a wired manner from the mock welding tool 310 to the controller 330. The controller 330 generates control parameters based on the data from the mock welding tool 310 which is used to remotely control the robotic welding system 200. The mock welding tool 310 includes a processor (not shown) and memory (not shown) configured to collect the signals and generate the data, in accordance with one embodiment.

In one embodiment, the head-mounted display device 320 includes a welding helmet or mask 322 and two displays 324 (e.g., two high-contrast SVGA 3D OLED micro-displays) configured to display fluid and real time full-motion video from the remote welding site. The head-mounted display device 320 also includes two speakers 326 configured to play audio from the remote welding site in real time. In one embodiment, the head-mounted display device 320 interfaces in a wired manner with the controller 330 to receive the video and audio. In another embodiment, the interface may be wireless via a wireless transceiver device 328.

In one embodiment, the head-mounted display device 320 is tracked in three-dimensional space (e.g., similar to how the mock welding tool 310 is tracked via sensors and the controller 330). Tracking of the head-mounted display device 320 may be used to control the position of the camera 220, the microphone 240, and the auto-darkening filter 230 at the remote welding site. In this manner, as the human welder at the local site moves his/her head, the camera 220, the microphone 240, and the auto-darkening filter 230 at the remote welding site follows the movement (similar to how the welding torch 210 follows the mock welding tool 310). The camera 220, the microphone 240, and the auto-darkening filter 230 at the remote welding site may be operatively connected to, for example, a separate servomechanism system, in accordance with one embodiment.

Figure 5:
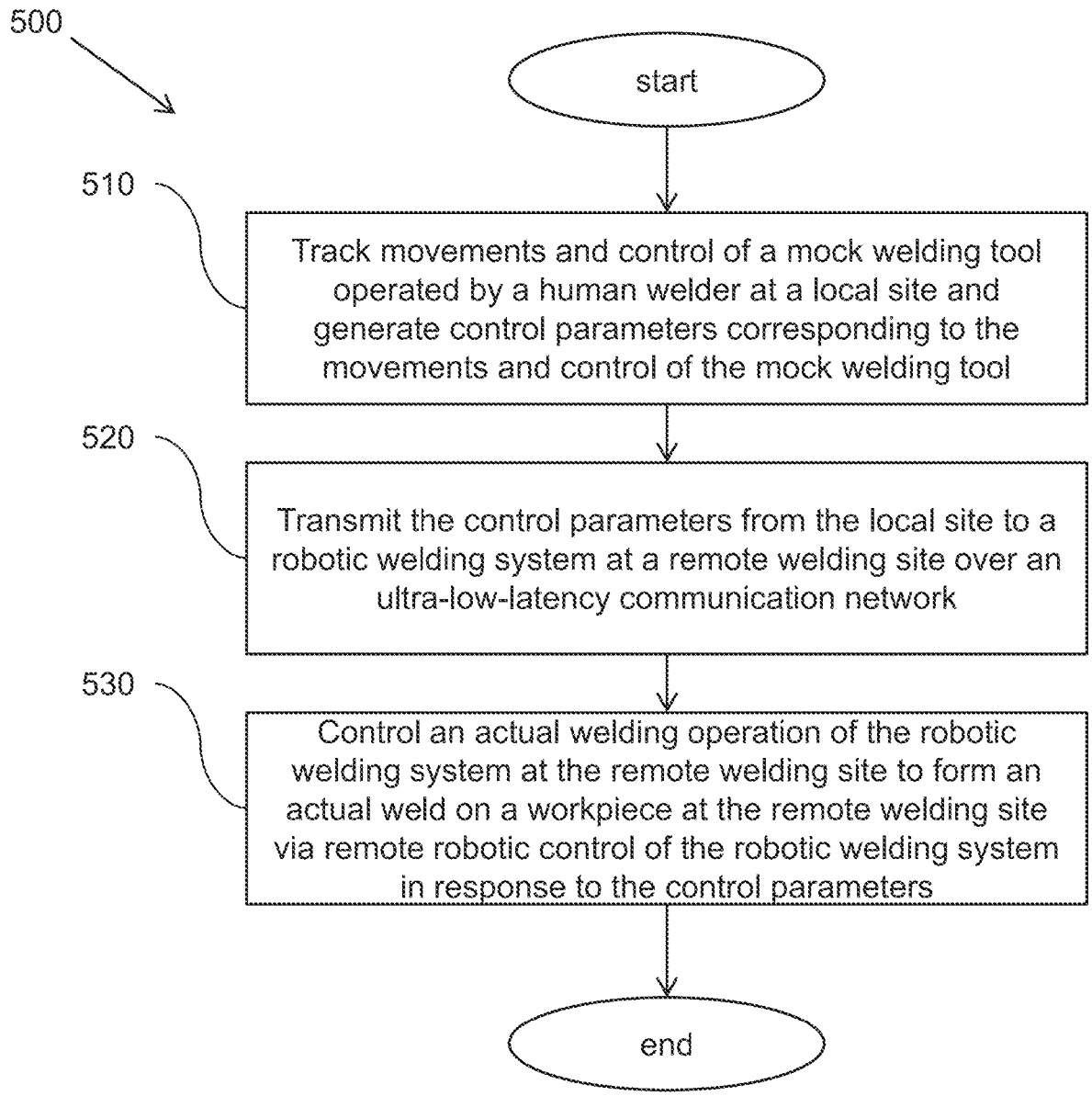
FIG. 5 illustrates a flowchart of an embodiment of a method of remotely controlling a robotic welding system over a long distance in real time.

FIG. 5 illustrates a flowchart of an embodiment of a method 500 of remotely controlling a robotic welding system over a long distance in real time (e.g., using the system 100 of FIG. 1). At block 510, movements and control of a mock welding tool 310 are tracked as the mock welding tool 310 is operated by a human welder at a local site. Control parameters are generated which correspond to the movements and the control of the mock welding tool 310. For example, in one embodiment, the control parameters are structured to communicate, to the robotic welding system 200, how to operate and control the welding torch 210 during an actual welding operation. The mock welding tool 310 may simulate characteristics (e.g., the gooseneck and the tip) of the actual welding torch 210, in accordance with one embodiment.

At block 520, the control parameters are transmitted from the local site to the robotic welding system 200 at the remote welding site over the ULL communication network 400. The round-trip communication latency between the local site and the remote welding site over the ULL communication network 400 is between 0.5 milliseconds and 10 milliseconds, and a straight-line distance (as the crow flies) between the local site and the remote welding site is at least 10 kilometers, in accordance with one embodiment. In accordance with another embodiment, the round-trip communication latency between the local site and the remote welding site over the ULL communication network 400 is between 0.5 milliseconds and 20 milliseconds, and a straight-line distance (as the crow flies) between the local site and the remote welding site is at least 50 kilometers. In still another embodiment, the round-trip communication latency between the local site and the remote welding site over the ULL communication network 400 is between 0.5 milliseconds and 50 milliseconds, and a straight-line distance (as the crow flies) between the local site and the remote welding site is at least 100 kilometers.

At block 530, an actual welding operation of the robotic welding system 200 is controlled at the remote welding site to form an actual weld on the workpiece 260 via remote robotic control of the robotic welding system 200 in response to the control parameters. The welding torch 210 of the robotic welding system 200 follows the movements and the control of the mock welding tool 310 operated by the human welder at the local site in real time. In accordance with one embodiment, the movements of the mock welding tool 310 operated by the human welder are along the simulated workpiece or coupon 340 at the local site. The simulated workpiece 340 may simulate the workpiece 260 at the remote welding site, in accordance with one embodiment.

During the actual welding operation, video and audio of at least an arc (i.e., a plasma arc) or a beam (i.e. an electron beam or a laser beam) formed between the workpiece 260 and the welding torch 210 (and/or of a region surrounding the arc or beam which includes at least a portion of the welding torch 210 and the workpiece 260) are captured at the remote welding site and transmitted to the local site over the ULL communication network 400. The video is displayed and the audio is played to the human welder at the local site in real time as the human welder moves the mock welding tool during the actual welding operation.

In one embodiment, a determination is made as to when the tip of the welding torch 210 of the robotic welding system 200 is not at a proper or specified distance from the workpiece during the actual welding operation at the remote welding site. Methods of making such a determination are well known in the art. A feedback signal is generated and transmitted (e.g., by the controller 250) from the remote welding site to the local site, over the ULL communication network 400, when the tip of the welding torch 210 is not at the specified distance from the workpiece. A haptic response is generated within the mock welding tool 310 at the local site in response to the feedback signal. The haptic response may be, for example, a vibration generated in the handle of the mock welding tool 310 (e.g., via a vibration device within the handle) which can be sensed by the human welder when holding the mock welding tool 310. Other haptic responses are possible as well, in accordance with other embodiments. In this manner, the human welder can respond by adjusting how close the tip of the mock welding tool 310 is to the workpiece 340 until the haptic response ceases.

In one embodiment, a determination is made as to when the welding torch 210 of the robotic welding system 200 is not at a proper or specified angle to the workpiece 260 during the actual welding operation at the remote welding site. Methods of making such a determination are well known in the art. A feedback signal is generated and transmitted (e.g., by the controller 250) from the remote welding site to the local site, over the ULL communication network 400, when the welding torch 210 is not at the specified angle to the workpiece 260. A haptic response is generated within the mock welding tool 310 at the local site in response to the feedback signal. Again, the haptic response may be, for example, a vibration generated in the handle of the mock welding tool 310 which can be sensed by the human welder when holding the mock welding tool 310. Other haptic responses are possible as well, in accordance with other embodiments. In this manner, the human welder can respond by adjusting the angle of the mock welding tool 310 to the workpiece 340 until the haptic response ceases.

In one embodiment, a determination is made as to when the welding torch 210 of the robotic welding system 200 is not moving at a proper or specified travel speed across the workpiece 260 during the actual welding operation at the remote welding site. Methods of making such a determination are well known in the art. A feedback signal is generated and transmitted (e.g., by the controller 250) from the remote welding site to the local site, over the ULL communication network 400, when the welding torch 210 is not moving at the specified travel speed across the workpiece 260. A haptic response is generated within the mock welding tool 310 at the local site in response to the feedback signal. Again, the haptic response may be, for example, a vibration generated in the handle of the mock welding tool 310 which can be sensed by the human welder when holding the mock welding tool 310. Other haptic responses are possible as well, in accordance with other embodiments. In this manner, the human welder can respond by adjusting the travel speed of the mock welding tool 310 across the workpiece 340 until the haptic response ceases.

Figure 6:
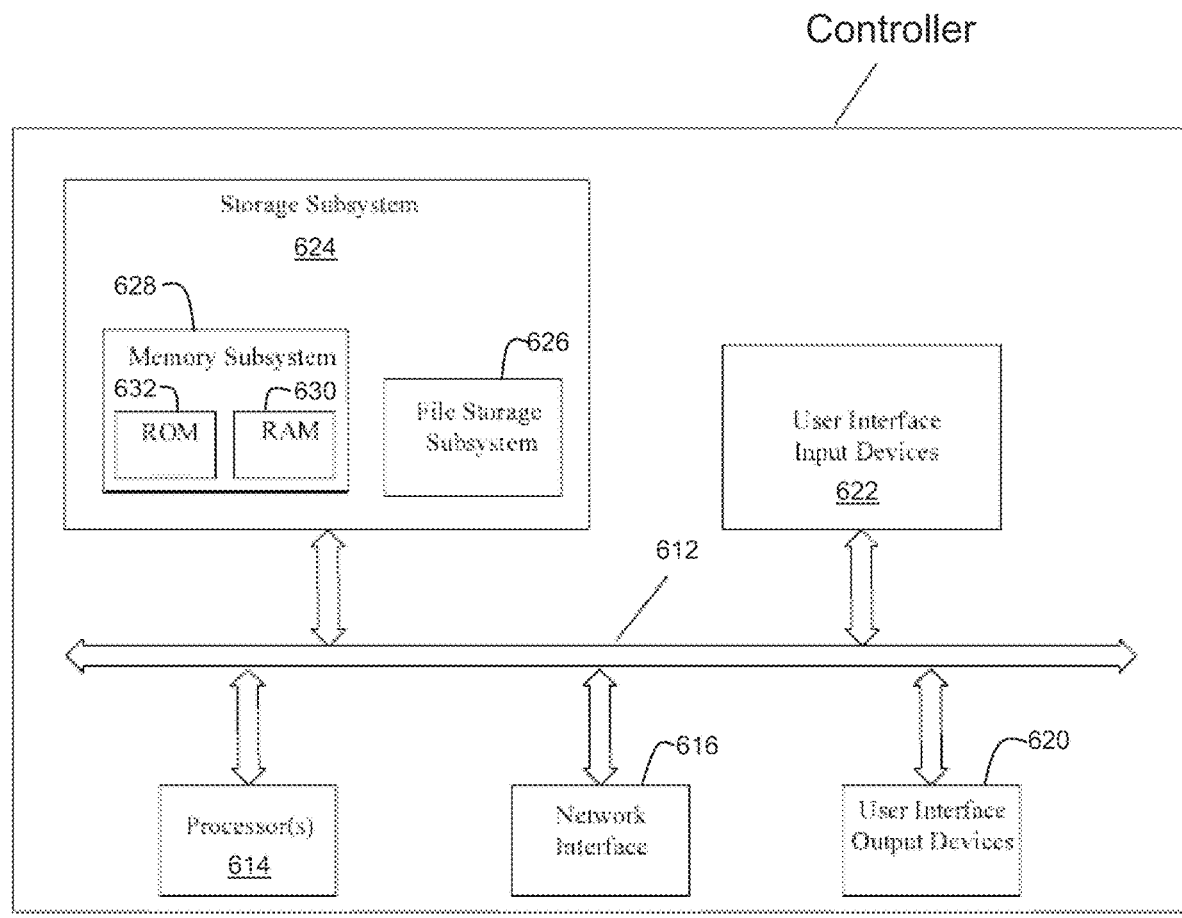
FIG. 6 illustrates an example embodiment of a controller of the robotic welding system of FIG. 2, or a controller of the simulated welding system of FIG. 3.

FIG. 6 illustrates an example embodiment of the controller 250 of the robotic welding system 200 of FIG. 2, or the controller 330 of the simulated welding system 300 of FIG. 3. The controller includes at least one processor 614 (e.g., a central processing unit, a tensor processing unit, a graphics processing unit) which communicates with a number of peripheral devices via bus subsystem 612. These peripheral devices may include a storage subsystem 624, including, for example, a memory subsystem 628 and a file storage subsystem 626, user interface input devices 622, user interface output devices 620, and a network interface subsystem 616. The input and output devices allow user interaction with the controller. Network interface subsystem 616 provides an interface to outside networks (e.g., the ULL communication network 400) and is coupled to corresponding interface devices in other devices (e.g., the mock welding tool 310 and the head-mounted display device 320). In one embodiment, at least one of the processors 614 is a tensor processing unit (TPU) which is an application specific integrated circuit (ASIC) created specifically for machine learning. Unlike a graphics processing unit (GPU), a TPU is structured to accommodate a larger volume of reduced precision computations.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller to the user or to another machine or computer system.

Storage subsystem 624 stores programming and data constructs that provide some or all of the functionality described herein. For example, computer-executable instructions and data are generally executed by processor 614 alone or in combination with other processors. Memory 628 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The computer-executable instructions and data implementing the functionality of certain embodiments may be stored by file storage subsystem 626 in the storage subsystem 624, or in other machines accessible by the processor(s) 614.

Bus subsystem 612 provides a mechanism for letting the various components and subsystems of the controller communicate with each other as intended. Although bus subsystem 612 is shown schematically as a single bus, alternative embodiments of the bus subsystem may use multiple buses.

The various components of the controller of FIG. 6 may employ advanced technologies including, for example, three-dimensional integrated circuit chips, three-dimensional integrated circuit chip-stacks, optical waveguides embedded in circuit boards, optical integrated transceivers within chip-stacks, and fully wireless chip-to-chip interconnectivity of circuit boards within a chassis. Other advanced technologies are possible as well, in accordance with other embodiments.

The controller can be of varying types including a workstation, server, computing cluster, blade server, server farm, or any other data processing system or computing device. Due to the ever-changing nature of computing devices and networks, the description of the controller depicted in FIG. 6 is intended only as a specific example for purposes of illustrating some embodiments. Many other configurations of the controller are possible, having more or fewer components than the controller depicted in FIG. 6.

Figure 7:
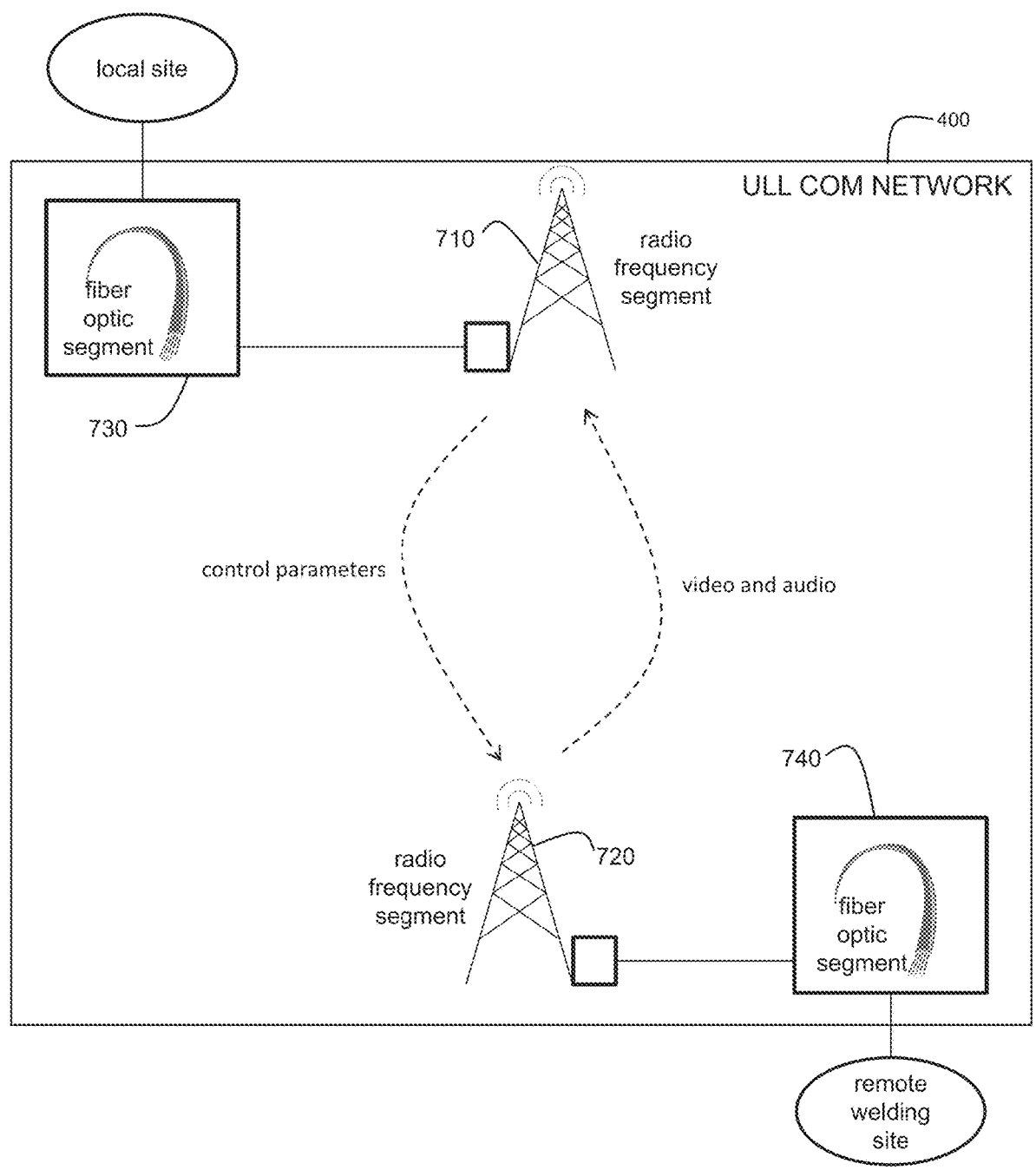
FIG. 7 illustrates one embodiment of an ultra-low-latency communication network of the system of FIG. 1.

FIG. 7 illustrates one embodiment of the ULL communication network 400 of FIG. 1. In one embodiment, the ULL communication network 400 includes a first radio frequency wireless network segment 710, a second radio frequency wireless network segment 720, a first optical fiber network segment 730, and a second optical fiber network segment 740. For example, the optical fiber network segments 730 and 740 exist closer to the edge of the ULL communication network 400 (i.e., near the local site and the remote welding site, respectively). The radio frequency wireless network segments 710 and 720 exist between the optical fiber network segments (e.g., to provide communication over the vast majority of the distance between the local site and the remote welding site). In one embodiment, the ULL communication network 400 is a dedicated and private network operating between the local site and the remote welding site.

Figure 8:
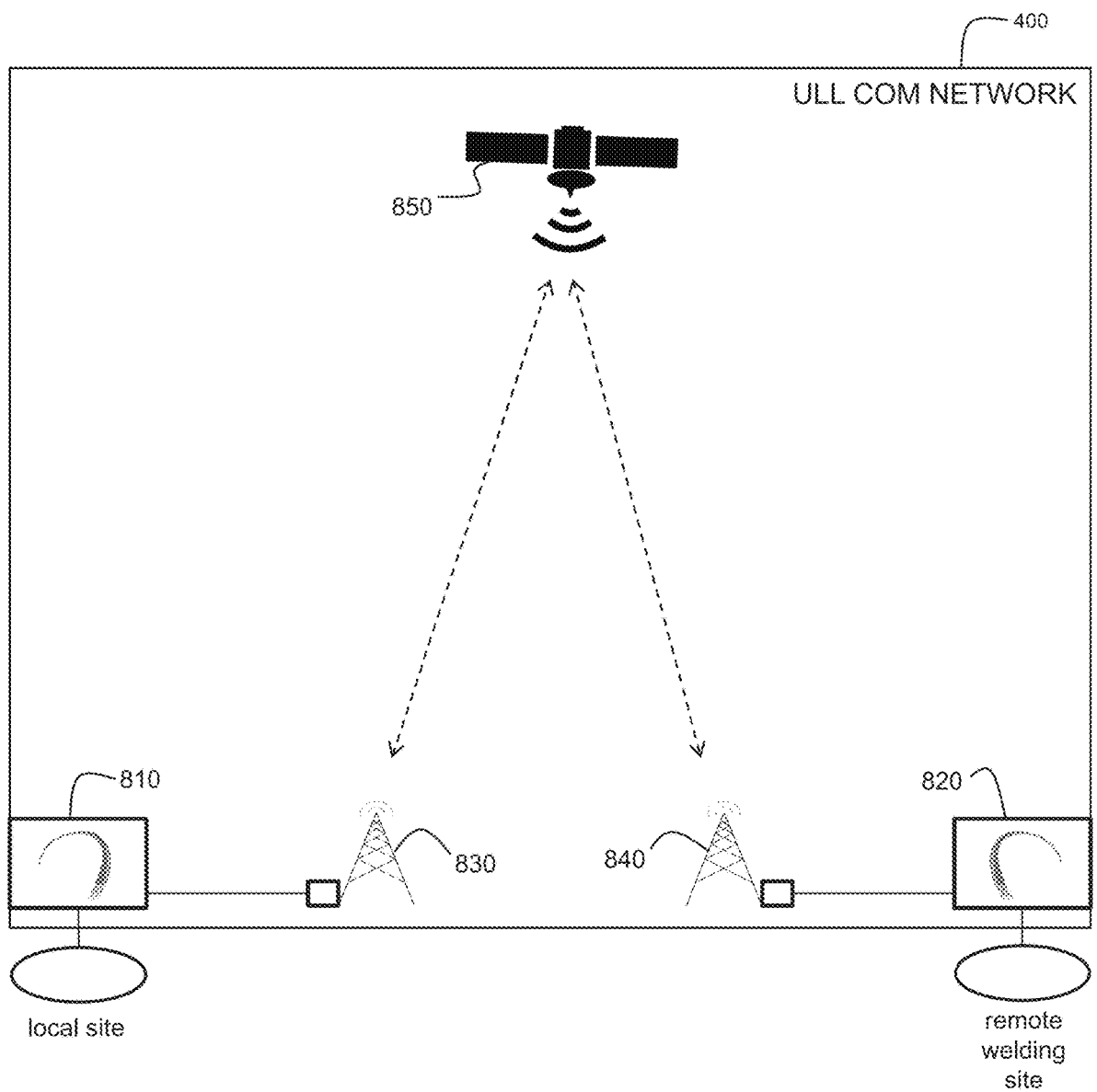
FIG. 8 illustrates another embodiment of an ultra-low-latency communication network of the system of FIG. 1.

FIG. 8 illustrates another embodiment of the ULL communication network 400 of FIG. 1. In one embodiment, the ULL communication network 400 includes a first optical fiber network segment 810, a second optical fiber network segment 820, a first radio frequency wireless network segment 830, a second radio frequency wireless network segment 840, and a Low Earth Orbit (LEO) satellite network segment 850. Again, the optical fiber network segments 810 and 820 exist closer to the edge of the ULL communication network 400 (i.e., near the local site and the remote welding site, respectively). The radio frequency wireless network segments 830 and 840, and the LEO satellite network segment 850, exist between the optical fiber network segments (e.g., to provide communication over the vast majority of the distance between the local site and the remote welding site). In one embodiment, the ULL communication network 400 is a publicly accessed network operating between the local site and the remote welding site.

In one embodiment, predictive, interpolative, and/or extrapolative techniques are employed near the edge of the ULL communication network 400. Such techniques allow a statistically comparable action to be automatically performed while a command for the actual action is still in transit over the ULL communication network 400. That is, the system 100 can anticipate an action to be taken and begin performing that action before the actual command to perform that action reaches, for example, the remote welding site. For example, in response to a human welder having moved the mock welding tool 310 with respect to the workpiece 340 at the local site over the last 10 milliseconds (resulting in corresponding control parameters), the controller 250 at the remote welding site (performing predictive, interpolative, and/or extrapolative techniques) can generate control parameters for controlling the welding torch 210 of the robotic welding system 200 for the next millisecond. In this manner, the latency impact can be diminished, possibly extending the distance over which a local site can operate with a remote welding site.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A system for performing long distance, real time, remote welding, the system comprising:
    a robotic welding system, configured to be set up at a remote welding site to perform an actual welding operation, the robotic welding system including:
        a welding torch, a camera, and
        a first controller configured to control the robotic welding system and capture video of at least an arc or a beam between a workpiece and the welding torch during the actual welding operation via the camera;
    a simulated welding system, configured to be set up at a local site, including:
        a head-mounted display device configured to be worn by a human welder to observe at least the video at the local site,
        a mock welding tool configured to remotely control the welding torch in response to the human welder holding and moving the mock welding tool at the local site while observing at least the video, and
        a second controller configured to control the simulated welding system and generate control parameters while tracking movements of the mock welding tool; and
    an ultra-low-latency communication network configured to provide communication of at least the video and the control parameters between the first controller at the remote welding site and the second controller at the local site, wherein a round-trip communication latency between the first controller and the second controller is between 0.5 milliseconds and 20 milliseconds, and wherein a straight-line distance between the remote welding site and the local site is at least 50 kilometers, and
    wherein the robotic welding system is configured to form an actual weld on the workpiece at the remote welding site, during the actual welding operation, via remote robotic control of the welding torch via the mock welding tool in response to at least the control parameters.

2. The system of claim 1, wherein the ultra-low-latency communication network includes a plurality of communication paths between the first controller at the remote welding site and the second controller at the local site, and wherein the first controller or the second controller is configured to run latency tests to determine the round-trip communication latency between the first controller and the second controller for the plurality of communication paths, and wherein the first controller or the second controller is configured to select an acceptable communication path of the plurality of communication paths for subsequent communication between the first controller and the second controller based on the round-trip communication latency as determined.

3. The system of claim 1, wherein the mock welding tool includes a wireless transmitter configured to wirelessly transmit data to the second controller.

4. The system of claim 1, wherein the head-mounted display device includes a wireless transceiver configured to wirelessly communicate with the second controller.

5. The system of claim 1, wherein the head-mounted display device includes one or more sensors configured to monitor at least one of a position and an orientation of the head-mounted display device and provide corresponding position and orientation signals to the second controller for tracking the head-mounted display device in three-dimensional space, and wherein the system is configured to remotely control a position and an orientation of at least the camera of the robotic welding system over the ultra-low-latency communication network based on the tracking of the head-mounted display device.

6. The system of claim 1, wherein the robotic welding system includes an auto-darkening filter, and wherein the first controller is configured to capture the video of at least the arc or the beam between the workpiece and the welding torch during the actual welding operation via the camera observing through the auto-darkening filter.

7. The system of claim 1, wherein the robotic welding system includes a microphone, and wherein the first controller is configured to capture audio of at least the arc or the beam between the workpiece and the welding torch during the actual welding operation via the microphone, and wherein the ultra-low-latency communication network is configured to provide communication of the audio from the first controller at the remote welding site to the second controller at the local site to be observed by the human welder via the head-mounted display device at the local site.

8. The system of claim 1, wherein the mock welding tool includes one or more sensors configured to monitor at least one of a position and an orientation of the mock welding tool and provide corresponding position and orientation signals to the second controller for tracking the mock welding tool in three-dimensional space.

9. The system of claim 1, further comprising one or more sensors, external to the mock welding tool, configured to monitor at least one of a position and an orientation of the mock welding tool and provide corresponding position and orientation signals to the second controller for tracking the mock welding tool in three-dimensional space.

10. The system of claim 1, wherein the ultra-low-latency communication network includes a first radio frequency wireless network segment, a second radio frequency wireless network segment, a first optical fiber network segment, and a second optical fiber network segment.

11. The system of claim 1, wherein the ultra-low-latency communication network includes a first optical fiber network segment, a second optical fiber network segment, a first radio frequency wireless network segment, a second radio frequency wireless network segment, and a Low Earch Orbit (LEO) satellite network segment.

12. The system of claim 1, wherein the ultra-low-latency communication network includes at least one of passive optical components, dark fiber, dispersion compensation modules, non-forward error correction transponders, software-defined networks, and network functions virtualization techniques.

13. A method of remotely controlling a robotic welding system over a long distance in real time, the method comprising:
tracking movements and control of a mock welding tool operated by a human welder at a local site and generating control parameters corresponding to the movements and the control of the mock welding tool;
transmitting the control parameters from the local site to a robotic welding system at a remote welding site over an ultra-low-latency communication network, wherein a round-trip communication latency between the local site and the remote welding site over the ultra-low-latency communication network is between 0.5 milliseconds and 50 milliseconds, and wherein a straight-line distance between the local site and the remote welding site is at least 100 kilometers; and
controlling an actual welding operation of the robotic welding system at the remote welding site to form an actual weld on a workpiece at the remote welding site via remote robotic control of the robotic welding system in response to the control parameters, wherein a welding torch of the robotic welding system follows the movements and the control of the mock welding tool operated by the human welder at the local site in real time.

14. The method of claim 13, further comprising:
the ultra-low-latency communication network providing a plurality of communication paths between the remote welding site and the local site;
running at least one latency test to determine the round-trip communication latency between the local site and the remote welding site for at least one of the plurality of communication paths; and
selecting an acceptable communication path of the plurality of communication paths, based on the round-trip communication latency as determined, for transmitting the control parameters from the local site to the remote welding site.

15. The method of claim 13, further comprising:
tracking a head-mounted display device, worn by the human welder, in three-dimensional space at the local site; and
remotely controlling a position and an orientation of at least a camera of the robotic welding system at the remote welding site over the ultra-low-latency communication network based on the tracking of the head-mounted display device.

16. The method of claim 13, wherein the movements of the mock welding tool operated by the human welder are along a simulated workpiece at the local site which simulates the workpiece at the remote welding site.

17. The method of claim 13, further comprising:
determining when a tip of the welding torch of the robotic welding system is not at a proper distance from the workpiece during the actual welding operation at the remote welding site;
transmitting a feedback signal from the remote welding site to the local site, over the ultra-low-latency communication network, when the tip of the welding torch is not at the proper distance; and
generating a haptic response within the mock welding tool at the local site in response to the feedback signal.

18. The method of claim 13, further comprising:
determining when the welding torch of the robotic welding system is not at a proper angle with respect to the workpiece during the actual welding operation at the remote welding site;
transmitting a feedback signal from the remote welding site to the local site, over the ultra-low-latency communication network, when the welding torch is not at the proper angle; and
generating a haptic response within the mock welding tool at the local site in response to the feedback signal.

19. The method of claim 13, further comprising:
determining when the welding torch of the robotic welding system is not moving at a proper travel speed with respect to the workpiece during the actual welding operation at the remote welding site;
transmitting a feedback signal from the remote welding site to the local site, over the ultra-low-latency communication network, when the welding torch is not moving at the proper travel speed; and
generating a haptic response within the mock welding tool at the local site in response to the feedback signal.

20. The method of claim 13, further comprising employing at least one of predictive, interpolative, or extrapolative techniques, near an edge of the ultra-low-latency communication network near the remote welding site, to anticipate the control parameters corresponding to the movements and the control of the mock welding tool over a next millisecond or more.

21. The method of claim 13, further comprising:
capturing audio of at least an arc or a beam formed between the workpiece and the welding torch during the actual welding operation at the remote welding site;
transmitting the audio from the remote welding site to the local site over the ultra-low-latency communication network; and
playing the audio to the human welder at the local site in real time as the human welder moves the mock welding tool during the actual welding operation.

22. The method of claim 13, further comprising:
capturing video of at least an arc or a beam formed between the workpiece and the welding torch during the actual welding operation at the remote welding site;
transmitting the video from the remote welding site to the local site over the ultra-low-latency communication network; and
displaying the video to the human welder at the local site in real time as the human welder moves the mock welding tool during the actual welding operation.

* * * * *